United States Patent
Rubin

(12) 
(10) Patent No.: US 6,420,720 B1
(45) Date of Patent: Jul. 16, 2002

(54) COUNTERMEASURE METHOD

(75) Inventor: Eugene S. Rubin, Waban, MA (US)

(73) Assignee: BAE Systems Information and Electronic Systems Integration, Inc., Nashua, NH (US)

(*) Notice: Subject to any disclaimer, the term of this patent is extended or adjusted under 35 U.S.C. 154(b) by 0 days.

(21) Appl. No.: 05/543,297

(22) Filed: Jan. 20, 1975

(51) Int. Cl.[7] ............... G01J 1/00; H04K 3/00; G02B 26/02; B64D 47/06
(52) U.S. Cl. ............... 250/504 R; 244/3.16; 359/233; 359/236; 359/298; 359/111; 340/981
(58) Field of Search ............... 250/495, 504, 250/495.1, 504 R; 340/50, 25, 366 F; 240/24, 49, 41.35 R, 41.35 A, 41.35 C, 41.37, 46.47, 50, 103 R; 350/259; 273/105.3; 244/3.16, 3.13; 343/18 E; 359/235, 236, 298, 111, 233; 380/981

(56) References Cited

U.S. PATENT DOCUMENTS

| | | | | |
|---|---|---|---|---|
| 1,238,220 A | * | 8/1917 | Thurber ............... | 240/49 |
| 1,417,457 A | * | 5/1922 | Cook ............... | 240/49 |
| 3,086,202 A | * | 4/1963 | Hopper et al. ............... | 273/105.3 |
| 3,623,726 A | * | 11/1971 | Pittinger et al. ............... | 273/105.3 |
| 3,797,395 A | * | 3/1974 | Tyroler ............... | 250/495 |

* cited by examiner

Primary Examiner—Stephen C. Buczinski
(74) Attorney, Agent, or Firm—Daniel J. Long

(57) ABSTRACT

A method of countermeasuring heat seeking missiles is disclosed in which an infrared source is spatially modulated by providing a beam from the source which is swept past a point in space to produce pulsed infrared energy at this point. In one embodiment the beam is swept around a 360° azimuth for omnidirectional protection.

7 Claims, 2 Drawing Sheets

PRIOR ART TEMPORAL MODULATION

IMAGE PROJECTED WITH REFRACTIVE OPTICS (ENERGY LOST)

IMAGE PROJECTED WITH REFLECTIVE OPTICS

COUNTERMEASURE METHOD

This invention relates to modulated infrared countermeasuring of heat seeking missiles and more particularly and generically to a method of countermeasuring in which spatial modulation is provided by the rotation of an infrared (IR) beam in a 360° azimuth.

The modulation of infrared radiation, due to its long wavelength, has not been accomplished easily in the past. Problems in modulation of infrared energy include those of unwanted refraction due to the long wavelengths as well as absorption of the energy by the apparatus utilized in the modulation technique. Absorbed energy is reradiated in a diffused pattern thereby in many instances degrading the modulation. Additional problems center around materials which can withstand the infrared radiation while the same time being sufficiently light weight and structurally stable enough to withstand cyclic motion normally employed in the production of a modulated beam. It will be appreciated that when IR sources include heated elements, modulation of the energy to the element is ineffective to cause modulation of the radiation from the element due to the long heating and cooling cycles inherent with the IR sources in which elements are heated.

One of the most important applications of modulated infrared sources is in the area of infrared countermeasures. In this application, the modulated infrared source is employed to render ineffective heat seeking missiles which typically home in on the heat generated by the engines which propel the target at which the missile is aimed. These engines include internal combustion engines, jet engines, rocket engines or the like.

In general, it is the purpose of the infrared countermeasure device to produce a modulated infrared signal of sufficiently high intensity to mask the infrared output from the above mentioned engines. Modulated infrared sources exist in the prior art which employ IR sources with temporal modulators. This invokes the so-called "chopper" technique, in which apertures spaced from the source are sequentially covered and uncovered in a shutter technique. However, in these sources when the apertures are covered energy radiated from the IR source is either absorbed by the occluding member or reflected back into the source at a non-optimum angle such that this energy is lost. Where energy for the IR source is virtually unlimited, such as is the case when fuel is burned for the production of infrared radiation, temporal modulation techniques work well. Temporal modulation of electrically powered sources also works quite well where sufficiently large amounts of electrical power are available as in jet powered fighter aircraft. However, when the IR source must depend for its energy on electrical power which is critically limited, to overcome radiation from the target's engines it is desireable that as much of the energy from the IR source as possible be utilized in order that the infrared source radiate sufficient energy to blanket or mask the infrared energy from the target's engine.

Moreover, to provide omnidirectional coverage the infrared source must be omnidirectional so as to be able to countermeasure heat seeking missiles coming in from any direction. In the prior art omnidirectional coverage has been obtained by the provision of a large number of apertures about the IR source. The modulation is obtained by the rotation of a cylindrically shaped mask in front of the apertures. While these systems are effective where unlimited power is available, the provision of temporal modulation presents a problem of efficiency which can be critical in many applications because the radiation from the source may be blanketed or masked by the radiation from the target.

The above problems are solved by the subject invention in which close to 100% of the infrared energy is coupled onto into space by "spatial modulation". The term "spatial modulation" as used herein refers to the formation of an infrared beam in which the infrared beam is swept past a point in space removed from the infrared source a number of times per second, corresponding to the frequency of the modulation. In one embodiment of the subject invention this is accomplished by rotating the focusing optics about a stationary infrared source at an rpm commensurate with the modulation frequency desired. Alternatively the entire source can be rotated or reciprocated to produce a sweeping beam.

It is therefore an object of this invention to provide an improved countermeasure method.

It is another object of this invention to provide a method including a spatially modulated infrared source for countermeasuring heat seeking missiles.

It is a further object of this invention to provide a method of modulating an infrared source by the moving of focusing optics relative to the infrared source.

It is a yet still further object of this invention to provide an IR modulation method involving a spatially modulated omnidirectional infrared radiation source.

These and other objects of this invention will be better understood in connection with the following description in view of the appended drawings in which.

DETAILED DESCRIPTION

Figure 1:
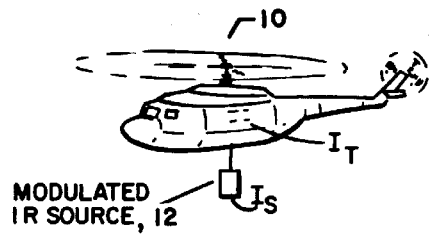
FIG. 1 is a diagrammatic representation of a typical infrared countermeasure situation.

Referring now to FIG. 1, a target 10 such as a helicopter is provided with a modulated infrared source 12. Because of the internal combustion or jet engine of the target the target radiates in the infrared region of the electromagnetic spectrum. The intensity of this infrared radiation is designated $I_T$ and in general involves a particular signature which varies with the configuration of the target as well as with the particular heat generating engine utilized. The intensity of the modulated infrared source is designated $I_S$. When this source is a point or line source it radiates omnidirectionally. If the radio $I_S$ to $I_T$ at any point in the far field is equal to or greater than 1 the modulated infrared source can be effective in countermeasuring incoming heat seeking missiles. Moreover, in some circumstances this ratio can be less than 1 and the modulated source will still be effective as a countermeasure. It is the function therefore of the modulated infrared source to produce modulated radiation of sufficient intensity to blanket or mask the essentially CW infrared radiation from the target to reduce the ability of the heat seeking missile to track the target and indicate to the heat seeking missile that the target is at a position in space removed from its actual position so that the heat seeking missile moves to a point in space at a distance sufficiently removed from the target to prevent damage to the target. This has been accomplished in the past by modulating the infrared source so that the detected radiation has a predetermined pulse pattern commensurate with that of the homing system of the missile.

As mentioned hereinbefore, where energy availability is not a problem, achieving the requisite $I_S/I_T$ ratio, typically called the jam to signal ratio, can be easily accomplished. However, for these targets in which energy is at a premium a more efficient modulating means than the temporal modulation of the prior art is necessary.

Figure 2:
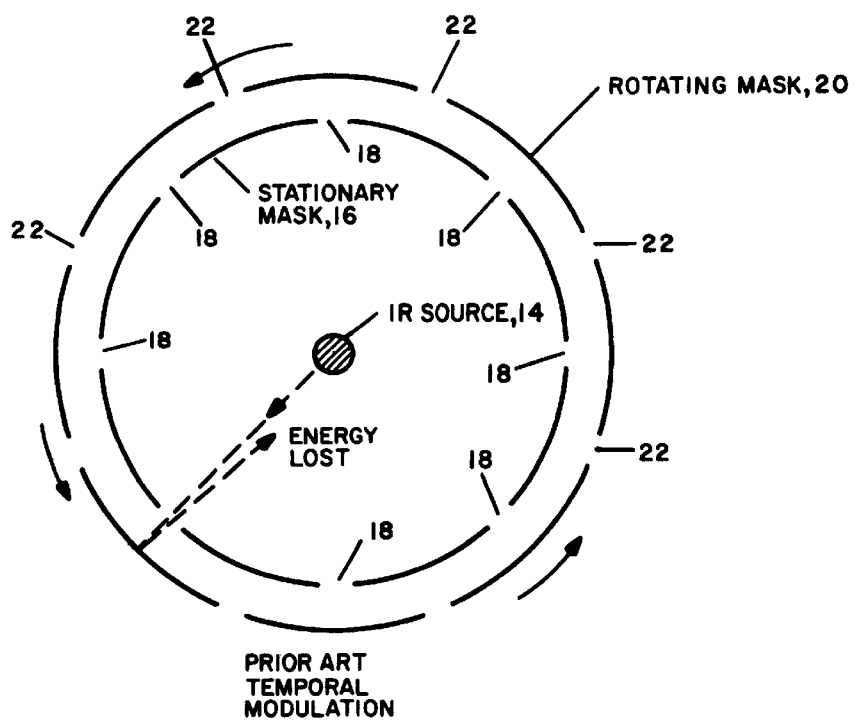
FIG. 2 is a diagrammatic representation of temporal modulation of an infrared source.

Temporal modulation of an infrared source, commonly known as "chopping", may be accomplished by the apparatus illustrated in FIG. 2. In this case an infrared source 14 is located within a stationary mask 16 which has apertures 18 spaced around the periphery. The stationary mask is located co-axially with respect to a rotating mask 20 having apertures 22 which, when the mask 20 is rotated, come into alignment with apertures 18 in the stationary mask. When apertures 18 and 22 are in alignment radiation from the infrared source 14 is transmitted to the far field. When there is misalignment between apertures 18 and 22 energy from the infrared source is either absorbed but the rotating mask or reflected back to the infrared source. It will be appreciated that a large portion of this energy is lost in this process, making the temporal modulator of FIG. 2 unacceptable in situations where only a limited amount of energy is available. As mentioned before, when energy is not at a premium the temporal modulation technique illustrated in FIG. 2 is entirely satisfactory for countermeasure purposes. However, because the energy is not focused from the IR source and more importantly because during a portion of the cycle the energy is absorbed by the rotating mask, the temporal modulation is not desired.

Figure 3:
FIG. 3 is a diagrammatic representation of an image projected with refractive optics.
Figure 4:
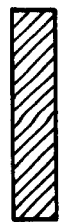
FIG. 4 is a diagrammatic representation of an image projected with reflective optics of the type constructed in accordance with the subject invention.

In addition to the provision of energy of the requisite intensity so that the above mentioned ratio is favorable, there is the problem of providing isotropically projected energy around an azimuth such that the energy is not distorted. When refractive optics are utilized to focus energy from an infrared source the image projected is not isotropic as illustrated in FIG. 3 but rather is broadened towards the edge of the image when a line source is projected. Thus when the modulated IR source is operating with very little tolerance in the margin necessary for the appropriate ratio it will be appreciated that intensity near the edge of the projected image may drop below the required ratio and thus the modulated source will be ineffective as a countermeasure. It is therefore desirable to project an image such as illustrated in FIG. 4 from a line source, in which the projected image is not too distorted. It will be appreciated that this line may subtend a vertical arc close to 180° such that the vertical beam angle is close to 180°. For the isotropically projected image the energy distribution across the projected image is uniform and maximized so that maximum use of the infrared source is possible. This type of image can be produced by the aforementioned temporal modulator of FIG. 2 since no focusing technique is utilized.

However, when energy is at a premium the temporal technique cannot be utilized and spatial modulation is required.

Figure 5:
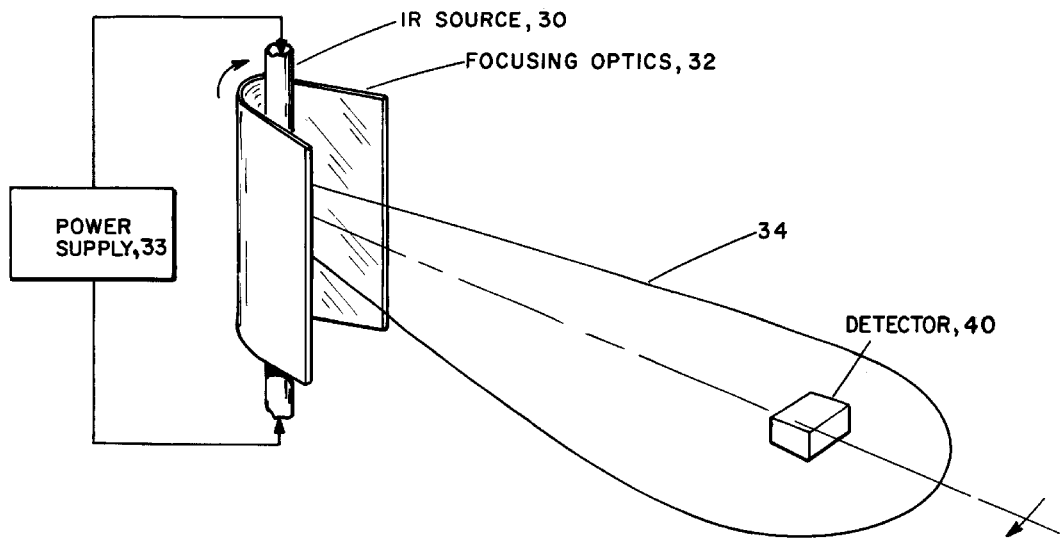
FIG. 5 is a diagrammatic representation of a spatial modulation technique.

Referring to FIG. 5, the concept of spatial modulation is illustrated. In general, spatial modulation refers to the sweeping of one or more focused beams from an infrared source past a point in space removed from the source. In this diagram an infrared line source 30 is illustrated and is surrounded by rotating focusing optics 32. The infrared line source may include an electrically heated silicon carbide rod such as that available from Norton Corp. under the trademark CRYSTAR across which electrical energy is coupled to heat the rod via power supply 33. In this system the optics are reflective and may include a reflector of parabolic cross section which is of the same length as the line source, with the IR source at its focus. The reflector is rotated about the source so as to project a sweeping narrow collimated beam 34. Because the line source is omnidirectional the vertical beam angle is close to 180° such that a sphere of protection is provided with each 360° sweep. Since the source is substantially omnidirectional, the unit housing the source and modulation apparatus can be mounted on any portion of the aircraft or slung from it as illustrated in FIG. 1. In the far field, blockage of the IR by portions of the aircraft is minimal. Moreover, it will be appreciated that more than one unit may be located on a target. Where the energy overlaps, these sources should be phase locked.

Figure 6:
FIG. 6 is a waveform diagram of intensity vs. time for radiation from the source of FIG. 5 as detected at a point in space removed from the source.

As illustrated the beam is made to rotate or revolve about the source such that the beam is repeatedly swept by a detector 40. The desired waveform at the detector 40 is illustrated in FIG. 6 to be a relatively sharp pulsed waveform in which the rise and decay of the pulse occurs rapidly as the beam is swept by a point in space. In this embodiment the intensity of the IR radiation at the detector forms a trapezoidal waveform which has been shown to be extremely effective in countermeasuring heat seeking missiles.

What has therefore been provided is a method for modulating an IR source such that little energy is lost and such that the required waveform exists at a point in space. This modulation is "spatial modulation" as defined herein. Moreover with a 360° sweep of the beam, 360° or omnidirectional coverage is provided. Obviously, by reciprocation of the optics, spatial modulation can be achieved. This spatial modulation of an IR source is extremely effective in countermeasuring heat seeking missiles and all spatial IR modulation techniques are within the subject method when used as countermeasures.

Spatial modulation techniques may also be applied to temporal infrared modulators in order to produce a modulation at a point in space in which two modulations are combined. In the subject case this is referred to as spatial-on-temporal modulation. The source in one embodiment is directional and a temporally modulated beam is produced by cyclically interrupting the beam. For spatial modulation, this beam is swept by a point in space removed from the source in a periodic manner such that the modulation at this point contains both temporal and spatial components. One such source is described more fully in U.S. Pat. No. 3,771,731 issued to Harry B. Dyner and Jacques A. F. Hill on Nov. 23, 1973, and assigned to the assignee hereof. It will be appreciated that spatial modulation may be achieved by rotation of this directional source about an axis perpendicular to the optical axis of the source.

Figure 7:
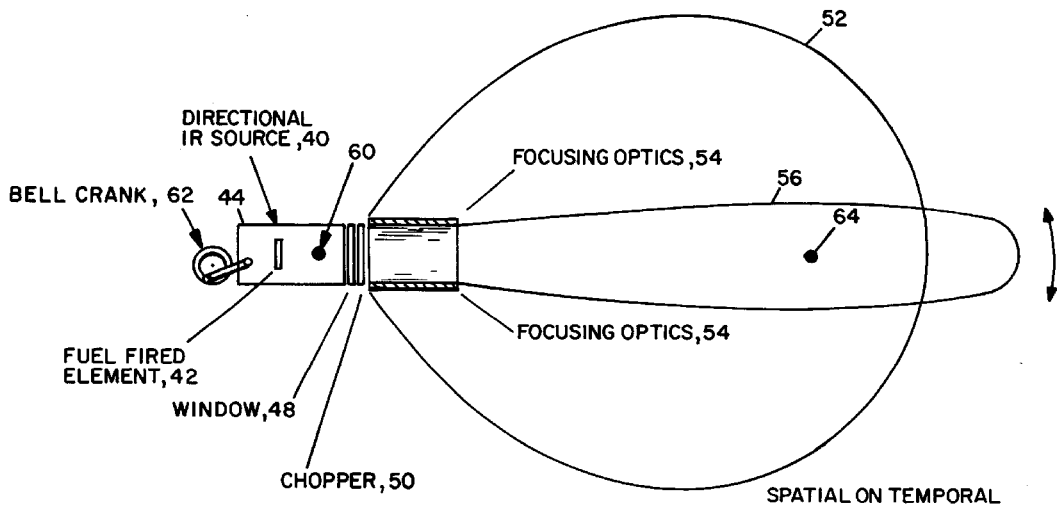
FIG. 7 illustrates apparatus for spatial on temporal modulation utilizing a reciprocating modulated source.

If as described in the above mentioned patent, the beam generated is temporally modulated as illustrated in FIG. 7, then spatial-on-temporal modulation will occur at a point in space removed from the directional IR source when the source is rotated or reciprocated. In this figure a directional infrared source is illustrated by source 40 which includes a fuel fired element 42 within a housing 44. When fuel is burned by the fuel fired element, the hot gasses produced exit housing 44 between the housing and a quartz window 48 into the atmosphere. A chopper generally indicated by reference character 50 periodically interrupts the beam from the source. This chopper may include a venetian blind technique similar to that described in the above-mentioned patent to periodically interrupt the infrared radiation from the fuel fired element. If focusing optics are not utilized, a dipole pattern such as indicated by dipole pattern 52 is produced. When focusing optics illustrated by reference character 54 are used, a narrow beam illustrated by reference character 56 may be formed. With the operation of chopper 50, either of the beams 52 or 56 carries temporal modulation. If housing 44 is pivoted at a point 60 and is reciprocated as by a bell crank mechanism generally indicated by reference character 62, then either of the beams will be reciprocated or moved in space. When the source is oscillated the beams may be swept by a point in space 64 thereby to give the beam received at this point a spatial as well as temporal modulation. The frequency of reciprocation may be varied in order that the spatial-on-temporal modulation be effective to countermeasure certain missiles which respond to high frequency IR modulation, or to countermeasure those missiles which respond to a modulated IR beam followed by dead space.

It will be appreciated that the directional IR source illustrated in FIG. 7 may be carried in a pod underneath an aircraft or on the wing of an aircraft and moved relative to the aircraft to create a sweeping beam. However, because of the mass of the pod, it may be difficult to reciprocate or rotate the pod in the manner shown in FIG. 7.

Figure 8:
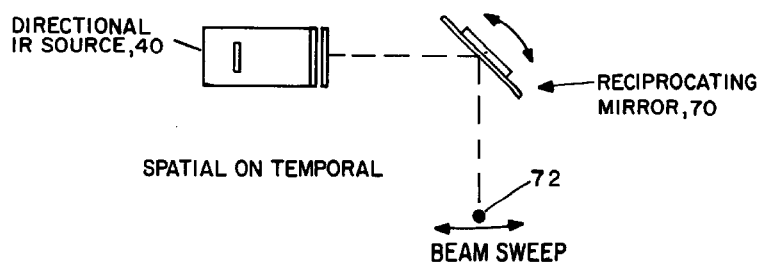
FIG. 8 illustrates apparatus for spatial on temporal modulation utilizing reciprocating optics.

To alleviate the necessity of swinging the pod, a configuration such as that illustrated in FIG. 8 may be used. Referring to FIG. 8, a directional source 40 similar to that shown in FIG. 7 is mounted in a stationary manner on the aircraft, with the beam sweep effected by the movement of a mirror 70 positioned in the IR beam with respect to the optical axis of the directional source. The mirror redirects the output from the directional IR source so as to effect a beam sweep past a point 72 in space removed from the source. Mirror 70 may be reciprocated or may actually be rotated to provide omnidirectional coverage for the directional source. As mentioned before, the directional IR source may be temporally modulated so that the modulation as it appears at point 72 has both spatial and temporal components. Alternatively, directional IR source 40 need not be temporally modulated, with the modulation being supplied by the reciprocating or rotating mirror.

One additional benefit achieved by the utilization of a directional IR source and focusing optics as illustrated in FIG. 7 is that the intensity of the beam at a given point may be increased, abeit at the expense of beam width or beam angle. Ordinarily, if the beam were not swept, the narrowness of the beam would severely limit the protection offered by the countermeasure device. However, in accordance with either FIG. 7 or 8 the beam is swept either by movement of the source or movement of the optics. Thus a highly intense beam may be projected while still achieving the same coverage as the unswept beam. The coverage is periodic in the sense that the beam is not present at every point within the effective beam angle all the time. However, since the beam is swept through this angle periodically, periodic directional or even omnidirectional coverage may be achieved, with the effective intensity at a given point enhanced at least for the time that the beam irradiates the given point. It will be appreciated that there is obviously a tradeoff between the narrowness of the beam so as to provide maximum intensity and the speed of the sweep. However, for most known heat seeking missiles, these missiles can be countermeasured by a sweeping beam such that infrared radiation need not impinge on the heat seeking missiles at all times. This system, therefore, increases (at least within certain limits) the effective output of the infrared source so as to increase the aforementioned jam ratio.

What has therefore been provided is a system for spatial modulation in which an inherently directional source can be moved so as to produce a sweeping beam. The directional source may be temporally modulated such that sweeping of the temporally modulated beam produces a spatial modulation superimposed on the temporally modulated beam.

In all of the embodiments described herein one essential characteristic is that an infrared beam is made to sweep by a point in space thereby to countermeasure a missile irradiated during the sweeps.

Although a specific embodiment to the invention has been described in considerable detail for illustrative purposes, many modifications will occur to those skilled in the art. It is therefore desired that the protection afforded by Letters Patent be limited only by the true scope of the appended claims.

I claim:

1. A method of countermeasuring a heat seeking missile approaching a heat radiating target in which the heat seeking missile has a guidance system comprising:

provide an infrared source at said target, and spatially modulating the radiation from said infrared source by generating a beam of infrared radiation and by periodically sweeping said beam past points in space to generate a number of pulses of infrared energy at each point in space for causing the guidance system in said heat seeking missile to guide and missile away from said target.

2. The method of clam 1 wherein said beam is swept by rotating focusing optics about the infrared source.

3. The method of claim 1 wherein the intensity of the infrared radiation at a point in space removed from the source as a function of time takes on a trapezoidal waveform.

4. The method of claim 1 wherein said beam generating step is accomplished with reflective optics.

5. The method of claim 1 wherein said infrared source is directional and wherein said sweeping step includes moving said source.

6. The method of claim 1 wherein said infrared source is directional and wherein said sweeping step includes a providing reflective means interposed in the path of said infrared beam and moving said reflective means with respect to the direction of said beam.

7. The method of claim 1 wherein said infrared beam is temporally modulated.

\* \* \* \* \*